(No Model.)

L. JOHNSON & L. FRIDLUND.
HEAT REGULATOR FOR COOKING STOVES.

No. 554,343. Patented Feb. 11, 1896.

Witnesses.
Howard W. Ott.
Ella V. Barnett.

Inventors.
Lewis Johnson
Lewis Fridlund.
By
Van Buren Hillyard.
Atty.

UNITED STATES PATENT OFFICE.

LEWIS JOHNSON AND LEWIS FRIDLUND, OF WILLMAR, MINNESOTA.

HEAT-REGULATOR FOR COOKING-STOVES.

SPECIFICATION forming part of Letters Patent No. 554,343, dated February 11, 1896.

Application filed June 17, 1895. Serial No. 552,987. (No model.)

*To all whom it may concern:*

Be it known that we, LEWIS JOHNSON and LEWIS FRIDLUND, citizens of the United States, residing at Willmar, in the county of Kandiyohi and State of Minnesota, have invented certain new and useful Improvements in Heat-Regulators for Cooking-Stoves, of which the following is a specification, reference being had therein to the accompanying drawings.

This invention relates to a heat-regulating appliance for cooking-stoves by means of which a proper temperature can be obtained for cooking any required article of food without burning or overheating the same, and has for its object to provide a device which can be applied to the ordinary stove-hole of a range or cooking-stove and by means of which the hottest fire can be tempered and the required heat or temperature attained necessary for the cooking of such articles as require a slow fire.

The present invention obviates the dampening of the fire, and by its use a high temperature can be maintained at one stove-hole and a low temperature, by comparison, maintained at an adjacent stove-hole, while the fire or initial heat is as great at one stove-hole as at the other.

The improvement consists, primarily, of two shallow vessels or pans of circular outline, the one placed within the other, and each having corresponding openings in their bottoms and sides and which are adapted to register, the inner pan or vessel being adapted to be turned by means of a suitable handle so as to bring the opening in the two vessels into or out of register or to an intermediate position between the extreme movements, so that a proper temperature can be obtained.

The invention also consists of the novel device which hereinafter will be more fully set forth and claimed and which is shown in the accompanying drawings, in which—

Figure 1:
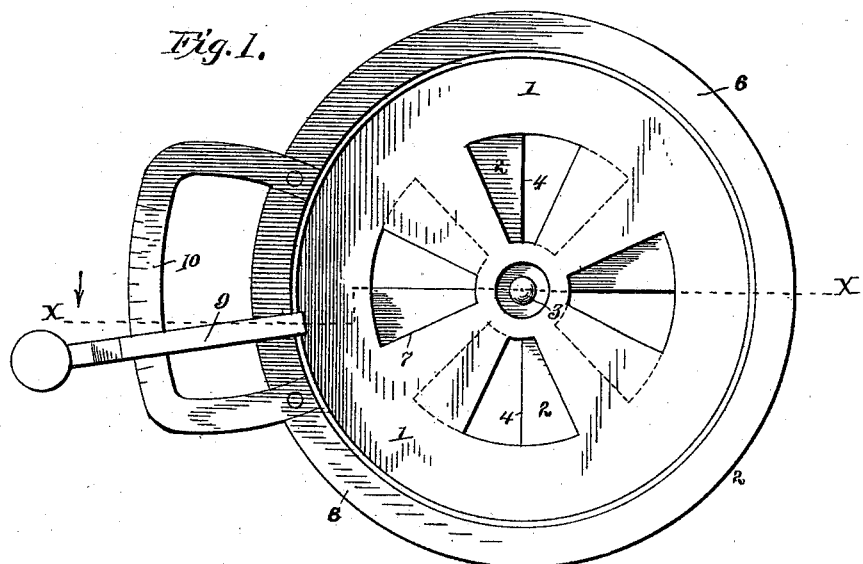
Figure 2:
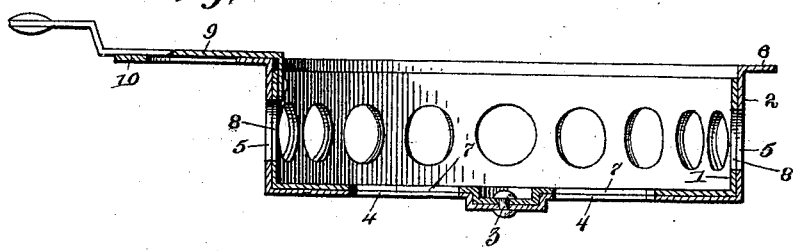
Figure 3:
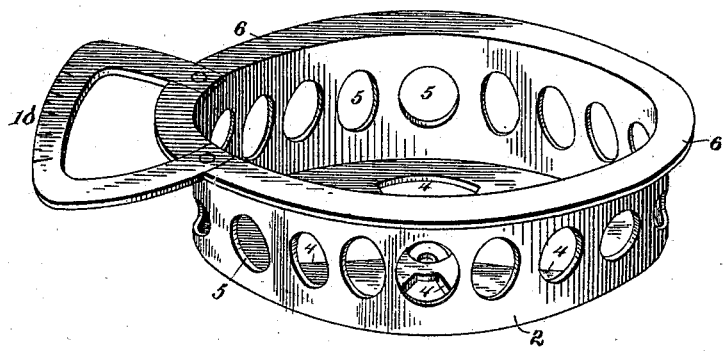

Figure 1 is a top plan view of the heat-regulator constructed in accordance with and embodying the essence of the present invention. Fig. 2 is a cross-section on the line X X of Fig. 1. Fig. 3 is a detail view of the outer pan or vessel.

The appliance comprises two concentric shallow pans or vessels 1 and 2, of similar formation, and these pans or vessels are circular and are positively secured together by means of a rivet or like fastening 3, which is located at a central point and forms a pivot for the inner pan, 1, to turn upon.

The outer pan, 2, is formed in its bottom with a series of openings 4 and in its sides with openings 5 and has an outer flange, 6, at its upper end to extend over the stove-hole and support the device therein.

The inner pan, 1, has openings 7 in its bottom corresponding in position and number with the openings 4, and in its sides with openings 8 to correspond with the openings 5, and in one position of the pans 1 and 2 the several sets of openings 4, 5, 7, and 8 will register, thereby attaining the minimum temperature possible with a given fire or initial heat. The inner pan or vessel, 1, is adapted to be turned within the outer pan, 2, so as to bring the said openings in or out of register, more or less, so as to attain the required effective heat or temperature for cooking, and this pan 1 is adapted to be turned by means of a handle 9 extending outwardly therefrom about in the plane of the upper edge of the appliance.

An approximately semicircular curved plate or bar 10 is firmly attached at its ends to the pan 2 and is adapted to form a support for the handle 9 and this plate or bar 10 is graduated in any convenient manner so as to serve in conjunction with the handle 9 to determine the extent to which the several sets of openings are brought in register and thereby enabling the proper adjustment of the said openings.

It is to be understood that the appliance will be provided in various sizes to adapt them for the different-sized stoves, and that they may be either struck up from sheet or plate metal or cast, as desired; or, if preferred, the outer pan can be cast and the inner pan struck up from sheet metal. When using the appliance the stove-lid is removed and the device fitted in the stove-hole and for heating small articles or boiling liquids in small utensils the same are placed upon the bottom of the contrivance, thereby bringing them in closer relation with the fire than would be possible if set upon the stove-lid, thereby enabling the heating to be accomplished in a shorter space of time. For frying or stewing the pan is placed upon the device and the heat controlled by a proper manipulation of the inner vessel so as to disclose the corresponding openings in the two vessels or pans to such an extent as to secure the required effective heat.

Having thus described the invention, what is claimed as new, and desired to be secured by Letters Patent, is—

1. An appliance to be fitted to the stove-hole of a range or cooking-stove for the purpose of controlling the effective heat, the same consisting of two shallow vessels having corresponding openings in their bottoms and sides, the one placed within the other and adapted to be relatively turned so as to bring the said openings into register, more or less, substantially as set forth.

2. A heat-controlling appliance for the stove-holes of cooking-stoves, comprising two shallow vessels having corresponding openings, the one placed within the other, the outer vessel having an outstanding support and the inner vessel having a handle to co-operate with the said support, substantially as described for the purpose set forth.

3. The herein-described heat-regulating appliance for the holes of cooking-stoves comprising shallow circular vessels having corresponding openings in their bottoms and sides, one vessel being placed within the other and held in place by a centrally-disposed rivet, the outer vessel having an outwardly-extending flange at its upper end, and having a substantially semicircular plate or bar formed with graduations and a handle secured to the inner vessel and resting upon the said support and co-operating with the graduations thereof to properly indicate the positioning of the said openings, substantially as set forth.

In testimony whereof we affix our signatures in the presence of two witnesses.

LEWIS JOHNSON.
LEWIS FRIDLUND.

Witnesses:
OLE FRIDLUND,
PETER LINDGUIST.